(12) United States Patent
Favoretto

(10) Patent No.: US 10,524,413 B2
(45) Date of Patent: Jan. 7, 2020

(54) CUTTING SYSTEM REDUCING CUTTING LOSSES AND HAVING A FLOATING DISK

(71) Applicant: Onivaldo Favoretto, Maringá (BR)

(72) Inventor: Onivaldo Favoretto, Maringá (BR)

( * ) Notice: Subject to any disclaimer, the term of this patent is extended or adjusted under 35 U.S.C. 154(b) by 13 days.

(21) Appl. No.: 15/551,877

(22) PCT Filed: Feb. 16, 2016

(86) PCT No.: PCT/BR2016/050030
§ 371 (c)(1),
(2) Date: Aug. 17, 2017

(87) PCT Pub. No.: WO2016/131116
PCT Pub. Date: Aug. 25, 2016

(65) Prior Publication Data
US 2018/0035607 A1   Feb. 8, 2018

(30) Foreign Application Priority Data

Feb. 18, 2015   (BR) .......................... 1020150034431

(51) Int. Cl.
| | |
|---|---|
| A01D 34/00 | (2006.01) |
| A01D 34/18 | (2006.01) |
| A01D 34/16 | (2006.01) |
| A01D 34/03 | (2006.01) |
| A01D 34/13 | (2006.01) |
| A01D 57/04 | (2006.01) |

(52) U.S. Cl.
CPC ............ A01D 34/18 (2013.01); A01D 34/03 (2013.01); A01D 34/13 (2013.01); A01D 34/16 (2013.01); A01D 57/04 (2013.01)

(58) Field of Classification Search
USPC .................................................. 56/307–310
See application file for complete search history.

(56) References Cited

U.S. PATENT DOCUMENTS

| | | | | |
|---|---|---|---|---|
| 6,085,510 | A * | 7/2000 | McDonnell ............ | A01D 57/10 56/12.9 |
| 6,651,411 | B1 * | 11/2003 | Becker .................... | A01D 57/04 56/10.2 A |
| 7,591,127 | B1 * | 9/2009 | Stacer .................... | A01D 65/00 56/12.9 |
| 7,870,713 | B2 * | 1/2011 | Schroeder .............. | A01D 57/10 56/12.8 |
| 2004/0216436 | A1 * | 11/2004 | Schmidt ................. | A01D 34/53 56/5 |
| 2007/0204583 | A1 * | 9/2007 | Coers ..................... | A01D 57/02 56/14.4 |
| 2007/0289278 | A1 * | 12/2007 | Coers ................... | A01D 41/141 56/14.4 |

(Continued)

*Primary Examiner* — Thomas B Will
*Assistant Examiner* — Mai T Nguyen

(57) ABSTRACT

Decisive modifications are proposed to a cutting system reducing cutting losses and having a floating disk, in order to improve the efficiency of the system. The lower finger (1) cuts at the lower level and has a tip pointing upwards to prevent the finger from entering the ground; weeds passing past the lower finger pass over the upper finger (3), the accumulation of branches between the fingers being thus prevented. The upper finger (3) has a guard (4) that prevents grains from dropping out of the cutting platform, and the guard is also used to mount two bearings which act to orient the cutter bar (2).

3 Claims, 1 Drawing Sheet

(56) References Cited

U.S. PATENT DOCUMENTS

| | | | |
|---|---|---|---|
| 2009/0107094 A1* | 4/2009 | Bich | A01D 41/141 56/10.2 E |
| 2010/0011728 A1* | 1/2010 | Pietricola | A01D 41/148 56/14.4 |
| 2015/0216123 A1* | 8/2015 | Digman | A01D 41/141 56/10.2 R |

* cited by examiner

CUTTING SYSTEM REDUCING CUTTING LOSSES AND HAVING A FLOATING DISK

The following description relates to the development of an anti-loss cutting system for cutting platform, whose construction allows the reduction of losses in the act of cutting the crop during harvesting.

STATE OF THE ART

It is known that agricultural harvesters in general must have an efficient adjustment to avoid losses during harvest.

There are many factors that increase the losses in the harvest, for example, poor soil preparation, occurrence of weeds, inadequate humidity, poor regulation, inadequate handling of the machinery, among others.

The present cutting system (FIG. 1) comprises the following components: lower finger, the upper finger, the knife guide baffle and finger reel, all grains that fall before the mark (A) in the baffle are discarded because of the outward baffle inclination.

Cutting system for machines are common in the art, for example, the Brazilian document PI 1004111-7 discloses a cutting system for a grain harvester where grain loss occurs due to the deflector inclination.

DISCUSSION

The current technology does not have a steps system and still has an outward inclination, allowing easier rolling of grains out of the cutting deck. Similarly, the current technology does not provide a sensor system that allows control the height of the reel's fingers in relation to the flexible cutter bar.

The present invention aims to develop items to be inserted in agricultural harvesters, in order to reduce crop losses caused by the loose grains at the time of cutting.

SUMMARY OF THE INVENTION

Thus, because of considerations pertaining to the prior art discussed above it is one of the objectives of the present invention, the constructive disposition introduced in the middle of anti-loss cut for cutting deck which are proposed decisive modifications in this cutting system to increase efficiency of the same. The following changes can be mentioned:

The lower finger provides lower cutting edge and is facing upwards, this prevents the same penetrating into the soil.

Weeds that pass through the lower finger pass over the upper finger, avoiding the accumulation of branches between the fingers.

The finger has an upper bulkhead which prevents grains from rolling out of the cutting deck, and it is also used to install two bearings which act as the cutter bar driver.

DESCRIPTION OF THE DRAWINGS

The characterization of the present invention is made by means of drawings showing the constructive disposition introduced in the middle of anti-loss cut for cutting deck, so that the equipment can be fully reproduced by the appropriate technique allowing for full characterization of the object claimed.

The figures show the best or preferred way to make the invention here disclosed, based on the descriptive part of the report, in order to determine the scope of protection here claimed.

These figures are merely illustrative and may present variations provided they do not escape the initially claimed features.

Figure 1:
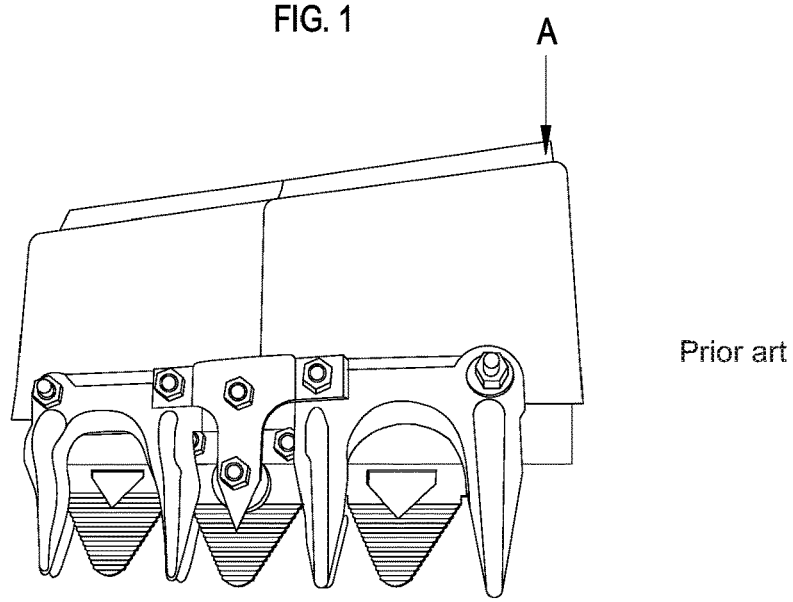
Figure 2:
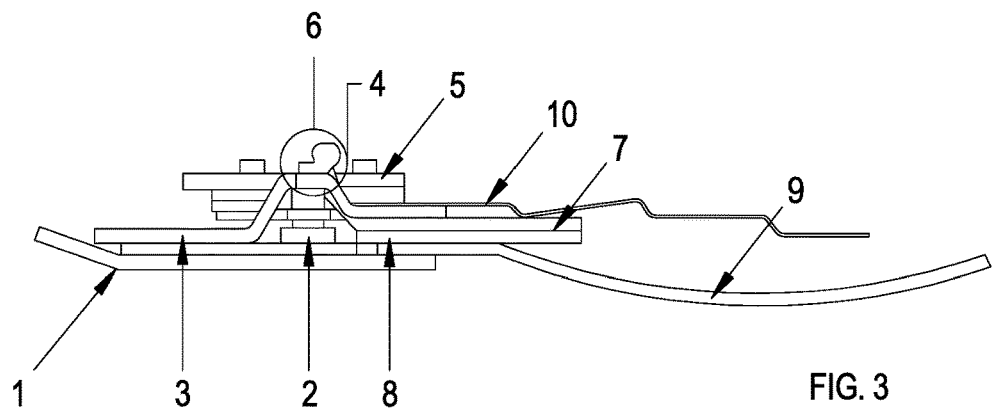
Figure 3:
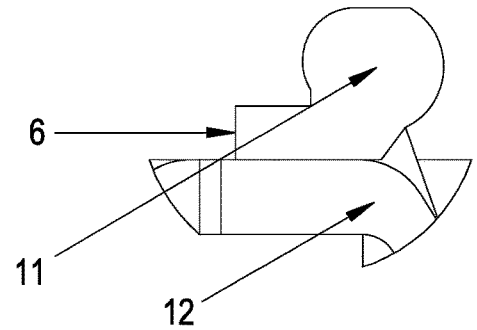

In this case we have:

FIG. 1 shows the state of the art, where all grains that fall before the mark (A) are discarded by the deflector baffle inclination;

FIG. 2 shows a cross section cut in the middle of a platform;

FIG. 3 shows the detail of the support and approaching sensors' bar protector.

DESCRIPTION OF THE INVENTION

Said bulkhead has on its surface an approaching sensor bar connected to an electronic circuit. To insert the sensor in the flexible cutter bar, there must be a system to ensure its protection, since the sensors are very sensitive mechanisms. Each reel finger also has an approaching sensor. This allows it to act as a floating reel. The floating reel is a set of fingers of the reel with an approaching sensor installed at the end of the fingers. The goal is to ensure that the reel is at a suitable distance from the flexible cutter bar, staying that way throughout the harvest. The sensor attached to the bulkhead installed in the flexible cutter bar activates an electronic system whenever the reel passes too close to it, so that the height adjustment between reel and cutting bar is maintained.

Currently, there is a manual lever that actuates the hydraulic piston to push away the reel, when one realizes that the flexible cutter bar is approaching the reel. However, this inspection is done visually, and it is very common that during harvest one does not realize this approach, which may result in cutting the reel finger, contributing to a decrease in harvest efficiency.

The sensor system intends to replace visual inspection of the approach, by the approaching sensor. To use the approaching sensor, it is necessary to program an electronic circuit. The sensor has a driver which is coupled to the network, wherein each finger has a point of connection with the network, thereby allowing a warning for moving away the reel from the flexible cutter bar. The box containing the electronic circuit and its components is located on a platform outside, it must be protected from moisture and it has a cooling system.

In the case of the deflector, the outward inclination existing in the current systems, is replaced by jolts or steps, which prevent the grains from rolling forward and falling. The change of the cutting means proposed by this invention combines technology and reduction of losses in the harvest while providing a corresponding increase of harvest of an hour a day.

A preferred form of construction employs the lower finger with the tip pointing upwards (1), containing the cutter bar (2) disposed between this lower finger (1) and the upper finger (3), wherein said upper finger contains a bulkhead (4), which prevents the grains from rolling off the platform and the driver (5) of the cutter bar (2), this driver provided with two bearings, and on the upper finger (3) has the nearest sensor bar (6) wrapped in a protective mass (11). On the sensor bar (6) has a metal tube (7) through which pass the wires from the sensors. The plate of fingers (8) receives an attached sliding plate (9) which is fixed below it, wherein the deflector (10) is provided with jolts to prevent the return of the grain. The metal tube (7) through which the wires of the sensors pass has a socket (12) in order to keep it held to the cutting system.

The invention claimed is:

1. An anti-loss cutting system with floating disk, comprising:
   a lower finger (1) having a tip pointing upwards;
   an upper finger (3);
   a cutter bar (2) disposed between the lower finger (1) and the upper finger (3);
   a bulkhead (4) arranged on the upper finger (3);
   a driver (5) arranged on the upper finger (3) for driving the cutter bar (2); and
   a bar (6) containing approaching sensors, wherein the bar containing approaching sensors is wrapped in a protective mass (11), which is arranged on the upper finger (3).

2. The anti-loss cutting system with floating disk according to claim 1, wherein the bar (6) containing approaching sensors has a metallic tube (7) through which wires of the approaching sensors pass, wherein the metallic tube (7) has a socket (12) in order to hold it to the cutting system.

3. The anti-loss cutting system with floating disk according to claim 1, further comprising a finger reel (8), an attached slide plate (9) attached below the finger reel (8), and a deflector (10) with elevations to prevent the return of grains.

* * * * *